T. G. SAXTON.
PISTON PACKING.
APPLICATION FILED APR. 10, 1917.

1,408,034.

Patented Feb. 28, 1922.
2 SHEETS—SHEET 1.

Witnesses
Philip E. Barnes
J. Ballard Moore

Inventor
Thomas G. Saxton
Dowell and Dowell
Attys.

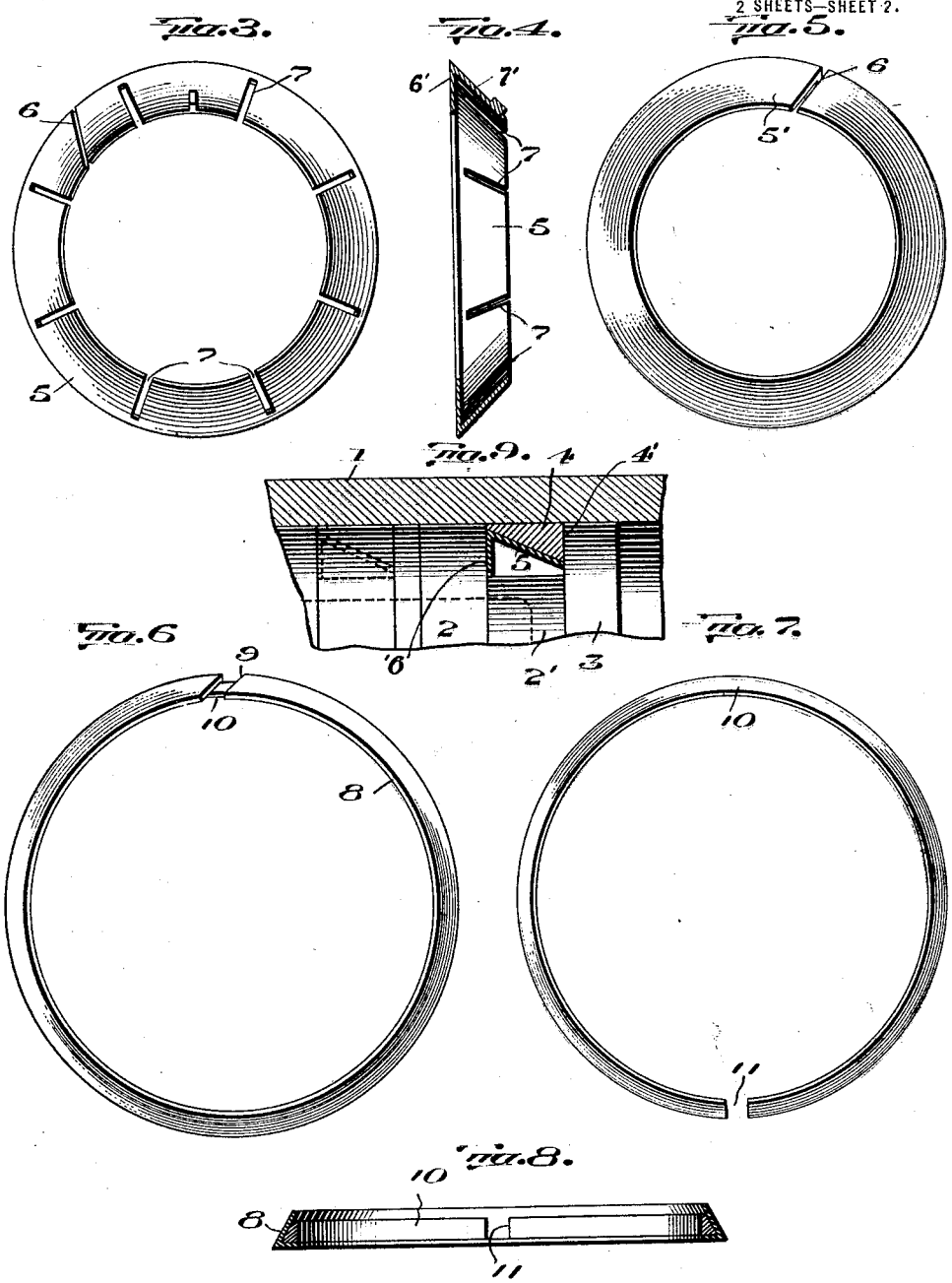

UNITED STATES PATENT OFFICE.

THOMAS GUNNI SAXTON, OF LEXINGTON, KENTUCKY, ASSIGNOR TO EMELIUS M. McKEE, OF LEXINGTON, KENTUCKY.

PISTON PACKING.

1,408,034.  Specification of Letters Patent.  Patented Feb. 28, 1922.

Application filed April 10, 1917. Serial No. 161,089.

*To all whom it may concern:*

Be it known that I, THOMAS G. SAXTON, a citizen of the United States, residing at Lexington, in the county of Fayette and State of Kentucky, have invented certain new and useful Improvements in Piston Packings; and I do hereby declare the following to be a full, clear, and exact description of the invention, such as will enable others skilled in the art to which it appertains to make and use the same.

This invention relates to pistons or piston packing, and more particularly to pistons of that class or type in which a metallic packing is used for maintaining the piston fluid-tight within the working cylinder of a steam, gas or other motive-power engine.

The objects of the invention are to provide a simple, light, efficient and inexpensive metallic packing of the character referred to in which conoidal split rings are used and which the packing presses circumferentially against the cylinder walls in a uniform manner.

A further object of this invention is to provide a packing having a light anti-friction outer member and an inner member which provides the necessary elasticity for the same.

A further object is to provide an improved form of inner member of light construction and possessing the necessary elasticity.

The invention will be readily understood from an inspection of the accompanying drawings and the following detailed description of the constructions illustrated therein.

Fig. 3 is a side elevation of the inner ring;

Fig. 4 is a section thereof;

Fig. 5 is a view of a similar ring without the slots;

Fig. 6 is still another form showing a non-slotted inner ring with an inner stiffening means;

Fig. 7 is a detailed elevation of said stiffening member;

Fig. 8 is a section of the ring and inner member shown in Fig. 6; and

Fig. 9 shows a single packing ring as actually used in practice; the relative size of inner and outer rings and their arrangement in a piston groove being illustrated.

Figure 1:
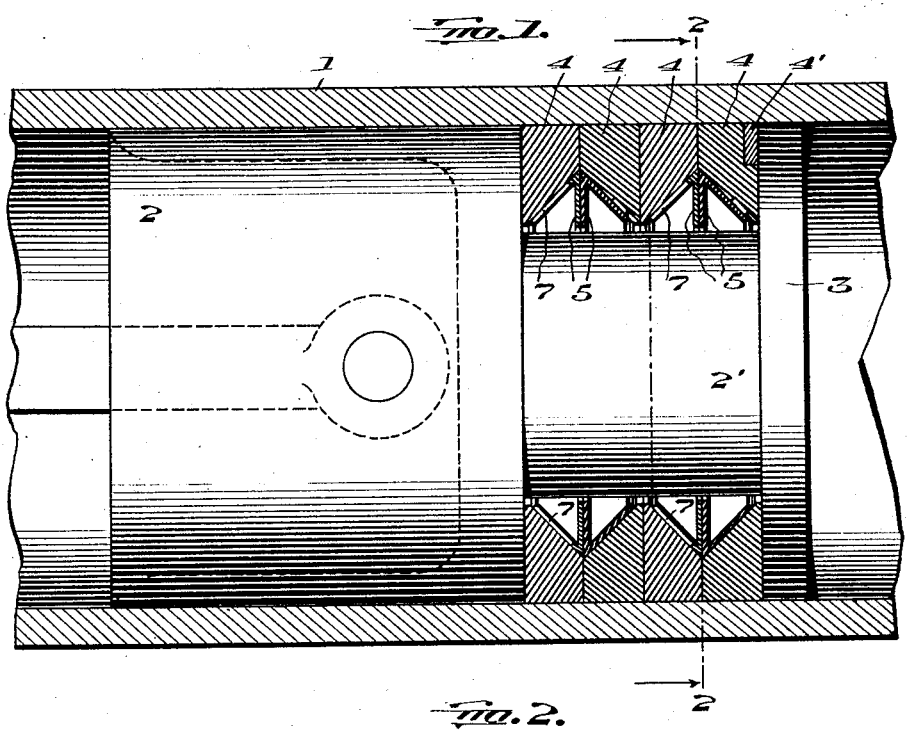
Fig. 1 is a longitudinal sectional view of a piston illustrating a number of my improved packing rings arranged therein.
Figure 2:
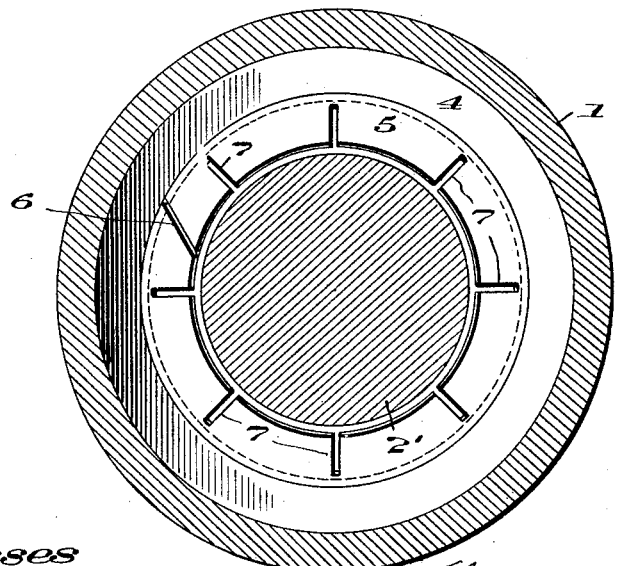
Fig. 2 is a section taken on line 2—2 of Fig. 1, clearly showing the slots in the wing of the inner ring.

Referring to the drawings, in which the same reference characters are used to designate corresponding parts in different views, 1 denotes the cylinder of a steam, gas or other engine provided with a piston 2 having a disk-like head 3 and an intermediate connecting portion 2' forming a recess for the reception of one or more of the improved packing rings.

As shown in Fig. 9, a single packing ring comprises an outer solid split ring or band 4 and an inner ring 5 split at 6. The inner ring 5 may be formed of a strip of metal, preferably spring steel and die pressed on a mandrel to true circular form and of a size to fit exactly within an outer ring 4 so that when removed from the mandrel it tends to open and assume a normal irregular-circular form or elliptical shape. The form of these inner rings is that of a frustrum-shell with an open top and base, except that the base is provided with an inwardly extending flange 6'. The inclined walls or wings 7' of these inner rings are adapted to fit within similar interior surfaces on the outer rings 4 and the base or lateral flanges 6' are adapted to fit to and bear against one vertical side wall of the piston groove, the other side thereof in a similar manner affording a bearing for the base 4' of the outer ring.

As shown sectioned in Fig. 9, the inner and outer rings constitute sections of reversely arranged triangles, the outer one being solid and the inner hollow, with the apex of the outer flush with the base 6' of the inner ring and the apex of the inner flush with the base 4' of the outer. The inclined surfaces between the two provide a bearing surface whereby adjusting movement is afforded and whereby the inner rings may adjust themselves outwardly relative to the exterior rings. The rings 4 being made of relatively soft anti-friction material, all wear from the cylinder walls will come on said rings and as the apex thereof gradually wears down the inner ring, due to the inclined bearing surfaces and their inherent resiliency, force themselves outwardly so that the junction of the base 6' and the inclined wall of the inner ring 5 becomes flush with the outer wearing surface of the outer ring 4 thereby sealing the split in said outer ring 4.

These inner rings may or may not be provided with open-ended slots arranged in the wings 7' thereof to compensate for lateral expansion and contraction, such slots preferably extending from a point near the base to the extremity thereof. And it is also within the contemplation of this invention to slot the base flanges 6'.

The outer split rings 4 are made of a softer anti-friction material such as aluminum alloy, or preferably of the same material as that of which the piston is made so that the relative rates of expansion will be the same. They are preferably made solid and triangular-shaped in cross section, as shown in Fig. 9, although it is evident that other shapes are contemplated, such as shown in Fig. 1. And they may or may not be provided with circumferential sealing rings or segments such as 4'. These rings are stamped or otherwise made to true circular form and while expansible do not possess the inherent elasticity to sustain themselves against the cylinder walls or against the side walls of the piston grooves. For this reason the inner spring rings of various forms disclosed herein are provided, affording the combined advantages of an outer anti-friction ring of perfect circular fit and an inner spring member of light weight.

When the inner rings 5, which are normally in expanded elliptical shape, are placed within the outer rings 4 and assembled in the piston grooves within the cylinder, the inner spring ring tends to assume its elliptical shape, forcing the outer circular packing member firmly against the cylinder wall, providing a uniform internal pressure circumferentially thereof.

And as will be seen, the inner ring 5 being normally in an expanded elliptical form, when contracted to the truly circular form, and placed within its outer ring, with its cone base 6' substantially flush with the thinner edge or apex of the cone of the overlying outer ring, and the combined width of the assembled rings approximately equal to the width of the groove in the piston in which they are fitted, so that the base of the cone of the outer ring will bear against one side wall of said groove, while the base of the cone of the inner ring bears against the opposite side wall of said groove, the combined action of the two rings is exerted in forcing the periphery of the outer ring against the inner wall of the cylinder uniformly around the entire circumference thereof and the thicker edge of the outer ring or base of the cone against one side wall of the groove, while the base 6' of the cone of the inner ring is forced against the opposite side wall of said groove, whereby it is impossible for the motive power fluid to escape past the packing.

It will also be evident that a single slotted ring as above described is not only a single connected ring but possesses all the advantages of a ring composed of a number of independent sections in which each section can adapt itself to irregularities in the cylinder wall, due to heating effects or imperfect machining.

These irregularities in the cylinder walls are common to all heat engines and are caused by the expansive force of the rings against the walls, which, being at a higher temperature and hence softer, are more susceptible to wear due to the travel of the piston and rings. And with the present construction of packing rings the desired results are obtained even in old cylinders without regrinding the same, and without losing any of the efficiency of looseness in the groove.

When the packing rings are used in pairs or multiples thereof, each distinct ring acts independently of the other in the piston groove and each ring is free to shift both laterally and outwardly to adjust itself with respect to the other ring and to the cylinder wall and each ring also acts as a seal for the next adjacent ring.

In Fig. 5 one of the inside rings 5' is shown as provided with the usual slit 6 but without the slots 7 in the wings.

The improved inner rings shown in Figs. 6, 7 and 8 are adapted to replace such an inner ring as is illustrated in Fig. 4 and consists of an outer split casing 8 of the same shape and cross section as the ring shown in Fig. 5 with the exception that this improved casing is made of mild steel, brass, aluminum or other non-spring metal and stamped or otherwise constructed that in its normal relaxed shape it fits in true circular form with the outer true circular ring 4 heretofore described.

Within this inner casing 8 is adapted to fit a spring member, herein shown as a split ring 11, preferably made of carbon steel and preferably of a cross-section to correspond with the inside conformation of the casing 8 so that the force of the spring is evenly distributed across the face of contact thereof.

When the inner ring 10 and casing 8 are assembled within the outer ring 4, a most perfect internal circular pressure against the cylinder wall is created, due to the fact that the irregular and uneven outward pressure of the spring is transmitted to the cylinder wall by means of the two concentric circular rings. An in this case even greater lightness of construction may be realized since the inner casing 8 may be made of lighter metal than required by a spring ring 5 such as shown in Fig. 4.

It is of course understood that these improved inner casings, spring members and outer rings 4 may be used either singly, as in Fig. 9, or in multiples thereof, as in Fig. 1.

A packing constructed as in Fig. 6 has many advantages over other devices in that the inner rings 8 are of stamped non-spring metal of true circular form and do not tend to spring into elliptical or irregular shape and hence make a true fit with the outer rings 4 which are also of true circular shape. Furthermore, the inner spring metal members 10 give the rings the required resiliency to force the outer member unfiormly against the cylinder wall. And these outer rings being made of non-friction metal do not score the walls thereof.

Having thus described my invention, what I claim as new and desire to secure by Letters Patent of the United States is:

1. A metal packing-ring comprising a hollow frustum provided with an inward-extending, marginal, basal flange, and a laterally inclined wing having open-ended, transversely-disposed slots to compensate for lateral expansion and contraction.

2. The combination with an outer ring having an inclined wall, of a resilient inner ring having an inwardly extending marginal flange adapted to bear against the vertical side wall of a piston-groove, and a wing inclined thereto and bearing against the inclined wall of the outer ring, said inclined wing also being provided with open-ended, transversely-disposed slots to compensate for lateral expansion and contraction.

3. A piston packing comprising an outer ring composed of aluminum alloy and having an interior inclined surface and an inner resilient ring having a laterally extending wing inclined to conform to the inclined surface of the overlying outer ring and also having an inwardly extending marginal flange arranged to bear against the vertical wall of the piston groove, said inclined wing having open-ended slots therein to compensate for lateral expansion and contraction.

4. A piston packing comprising an outer split ring of substantially triangular form in cross section constructed of relatively soft metal, and an inner resilient ring constructed of spring metal laterally inclined and fitting within and against a correspondingly inclined surface of the outer ring and having radially extending open-ended slots therein, and an inwardly extending marginal flange arranged to bear against the vertical wall of a piston groove.

In testimony whereof I affix my signature in the presence of two witnesses.

THOMAS GUNNI SAXTON.

Witnesses:
BRADLEY DIESON,
R. A. NORRISS.